Oct. 21, 1969     L. WINTER ETAL     3,473,598
GATE FASTENER
Filed April 4, 1968

INVENTORS
LEONARD WINTER
AND
RONALD LEIGHTY

United States Patent Office 3,473,598
Patented Oct. 21, 1969

3,473,598
GATE FASTENER
Leonard Winter, 1025 E. Ohio, and Ronald Leighty, 1213
6th St., both of Rapid City, S. Dak. 57701
Filed Apr. 4, 1968, Ser. No. 718,852
Int. Cl. E06b *11/06;* E05c *19/00*
U.S. Cl. 160—328                                        1 Claim

ABSTRACT OF THE DISCLOSURE

An improved gate fastener comprising a ring on an end of a chain, the opposite end of the chain being connected to a take-up mechanism, the take-up mechanism being mounted upon a fence post and the ring being receivable over a gate post.

---

This invention relates generally to gate latches.

A principal object of the present invention is to provide an improved gate fastener which is to be used on gates in place of metal loops for securing the same to an adjacent fence post.

Another object of the present invention is to provide an improved gate fastener having self-contained means for taking up a slack and drawing the gate towards the fence post.

Yet another object of the present invention is to provide a gate fastener which is particularly adaptable for gates of the type such as are used upon ranches and farms wherein the gate is comprised of parallel barbed wires of flexible character secured at their one ends to a gate post which accordingly in a closed position must be pulled toward a stationary fence post and secured thereto.

Other objects of the present invention are to provide a gate fastener which is simple in design, inexpensive to manufacture, rugged in construction, easy to use and efficient in operation.

Figure 1:
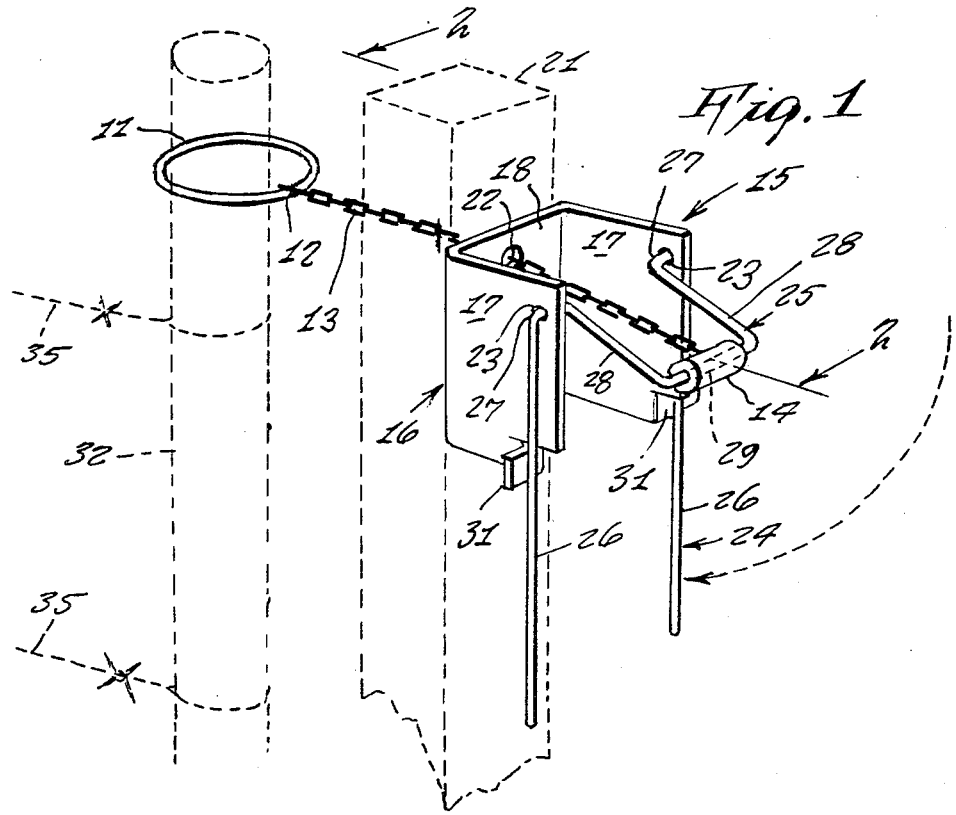
Figure 2:
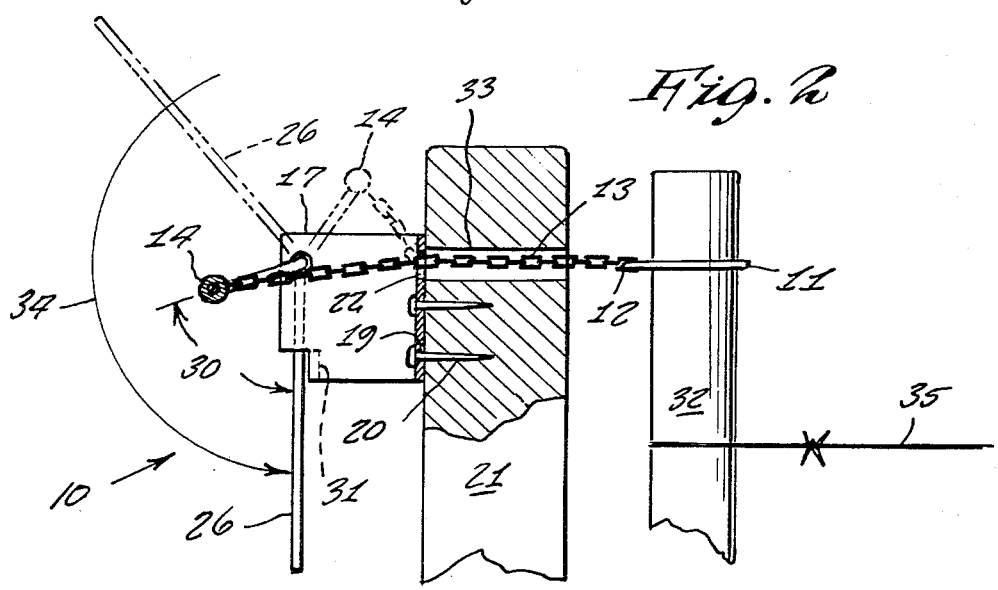

These and other objects will be readily evident upon a study of the following specification and the accompanying drawing wherein:

FIGURE 1 is a perspective view of the present invention shown securing a gate to a fence post; and FIGURE 2 is a side elevation view thereof shown partly in cross-section.

Referring now to the drawing in detail, the reference numeral 10 represents a gate fastener according to the present invention wherein there is a circular steel ring 11 secured to a chain repair link 12, the chain repair link being secured to one end of a length of chain 13, the opposite end of the chain being secured to a short length of pipe 14 that comprises a component of a take-up mechanism 15.

The take-up mechanism 15 includes a bracket 16 made of steel plate, the bracket being of generally U-shaped configuration or channel shaped having parallel opposite side walls 17 and an interconnecting wall 18 therebetween. The wall 18 is provided with a plurality of openings 19 therethrough for the purpose of receiving bolts, screws, or nails 20 for purpose of mounting the same upon the side of a fence post 21. Another opening 22 is provided in the interconnecting wall 18, the opening 22 allowing the chain 13 to pass therethrough. Each of the opposite side walls 17 are provided with an opening 23 for the purpose of supporting pivotally free a control lever 24 made from round steel rod that is configurated as shown in FIG. 1 of the drawing. The control lever 24 includes a central U-shaped portion 25 that is located between straight, parallel opposite ends 26 which serve as handles. An intermediate bent portion 27 between each handle 26 and the U-shaped portion 25 is adjournaled within each opening 23 of the bracket 16. The U-shaped portion 25 of the control lever includes parallel opposite legs 28 interconnected by an intermediate leg 29 upon which the iron pipe 14 is loosely fitted for purpose of being pivotally free thereupon. As shown in FIG. 2 of the drawing, it is to be noted that when the control lever is viewed from a side that an acute angle 30 is formed between the legs 28 and the handles 26 for a purpose which will be explained hereinafter. The lower corners of each of the side walls 17 of the bracket are outwardly bent so to form tabs 31 which serve as stops for the handles 26 of the control lever.

In operative use, the bracket 16 is secured upon a side of a fence post which may be of square or other cross-sectional configuration, the bracket being secured upon a side of the post which is opposite the side thereof toward which a gate post 32 is to be drawn when in a closed position. As shown in the drawing, if the fence post is taller than the gate post, an opening 33 is drilled through the fence post through which the chain 13 extends. When it is desired to close the gate, the control lever is lifted with the handles 26 in a raised position as shown by the phantom lines in FIG. 2 of the drawing, the ring 11 thus being in a most extended position for purpose of receiving therein the upper end of the gate post 32. The control lever is then grasped by the handle 26 which is then pivoted downwardly as indicated by the arrow 34 in FIG. 2, until the midportions of the handles 26 come into abutment with the stop tabs 31 upon the bracket. This movement will cause the chain to pull the ring 11 toward the fence post and thus bring the gate post close thereto while providing tension upon barbed wires 35 of the gate so to straighten them out and serve as gate barriers for preventing livestock from passing therethrough. As shown in FIG. 2, it will be noted that when the handles are in a vertical position that the pipe 14 has over-ridden past a pivot center due to the angle 30, thus preventing tension from the gate from opening up the control lever. The tension from the gate will thus cause the handles 26 to bear against the tab stops 31 until a person forcibly pivots the handle 26 so that it over-rides about its pivot point upwardly thus allowing slack to develop in the chain 13 for purpose of again removing the ring 11 from the upper end of the gate post 32.

Thus there has been presented a gate fastener which in summary comprises a ring at one end of a chain, receivable over a gate post, the other end of the chain being connected to a pivotable pick-up device mounted on a fence post.

We claim:

1. In a gate fastener, the combination of a ring made of steel, said ring being secured to a chain repair link at one end of a length of chain, said steel ring being receivable over the upper end of a gate post, the opposite end of said chain being secured to a pick-up mechanism securable to a stationary fence post, and said pick-up mechanism having self-contained means for drawing said gate post toward said fence post, said pick-up mechanism comprising a channel configurated bracket supporting a pivotably control lever, said lever carrying a pipe sleeve pivotally free thereupon, said pipe sleeve being rigidly affixed to the said opposite end of said chain, said bracket including parallel opposite side walls and an interconnecting wall therebetween, said interconnecting wall having a plurality of openings for receiving mounting means therethrough, and said interconnecting wall having an opening through which said chain extends, said control lever being comprised of a configurated steel rod having a U-shaped central portion between opposite, straight end portions forming handles, said central U-shaped portion comprising opposite parallel legs between which there is an interconnecting leg upon which said pipe sleeve is carried pivotally free, a bent portion between each said handle and said U-shaped portion, said bent portions being in axial alignment with each other and being journaled within said bracket, and said U-shaped portion of said control lever extending at an acute angle respective to said handles when said control lever is viewed from a side, an opening being provided in each of said side walls of said bracket to journal said control lever, and a stop tab being formed at a lower corner of said bracket side walls to limit the travel of said handles, said stop tabs each being in alignment to abut a midportion of each said control lever leg.

References Cited

UNITED STATES PATENTS

| | | | |
|---|---|---|---|
| 639,573 | 12/1899 | Hobart | 160—328 |
| 762,481 | 6/1904 | Klipping | 160—328 |
| 919,705 | 4/1909 | Edwards | 160—328 |
| 2,747,910 | 5/1956 | Salmon | 160—328 X |

DAVID J. WILLIAMOWSKY, Primary Examiner

P. C. KANNAN, Assistant Examiner

U.S. Cl. X.R.

292—246, 264